United States Patent [19]

Trost et al.

[11] Patent Number: 5,477,841
[45] Date of Patent: Dec. 26, 1995

[54] MAGNETIC IGNITION SYSTEM

[75] Inventors: Jürgen Trost, Grafenberg; Eberhard Schieber, Backnang, both of Germany

[73] Assignee: Andreas Stihl, Waiblingen, Germany

[21] Appl. No.: 353,177

[22] Filed: Dec. 9, 1994

[30] Foreign Application Priority Data

Dec. 9, 1993 [DE] Germany .............. 43 41 963.1

[51] Int. Cl.⁶ ........................................ F02P 3/06
[52] U.S. Cl. ........................... 123/599; 123/149 D
[58] Field of Search ................ 123/149 D, 149 C, 123/599, 602; 310/70 R, 70 A, 156

[56] References Cited

U.S. PATENT DOCUMENTS

| | | | |
|---|---|---|---|
| 2,786,145 | 3/1957 | Phelon et al. | 123/149 D X |
| 3,599,615 | 8/1971 | Foreman et al. | 123/149 C X |
| 3,619,634 | 11/1971 | Burson | 123/602 X |
| 3,809,040 | 5/1974 | Burson et al. | 123/149 D X |

FOREIGN PATENT DOCUMENTS 3630723  3/1988  Germany .

*Primary Examiner*—Tony M. Argenbright
*Attorney, Agent, or Firm*—Robert W. Becker & Associates

[57] ABSTRACT

A magnetic ignition system for an internal combustion engine has a magnet wheel revolving with the crankshaft of the engine. At least one permanent magnet rotates with the magnet wheel. A stationary armature with a coil is provided. The permanent magnet induces a voltage in the coil, and the voltage is supplied to an energy storage. The magnet wheel has a magnet support made of a magnetically conducting material. A section of the magnet support that is in magnetic shunt is magnetically saturated.

17 Claims, 5 Drawing Sheets

MAGNETIC IGNITION SYSTEM

BACKGROUND OF THE INVENTION

The present invention relates to a magnetic ignition system for an internal combustion engine, especially a motor chainsaw. Such a magnetic ignition system has a magnet wheel that revolves with the crankshaft of the engine, at least one permanent magnet which rotates with the magnet wheel, and an armature with coil connected to the housing. A voltage is induced in the coil by the permanent magnet, the voltage being supplied to an energy storage. A magnet support is arranged at the magnet wheel for receiving the permanent magnet.

A magnetic ignition system of the aforementioned kind is known from German Patent 36 30 723. A magnet wheel revolving with the crankshaft has a permanent magnet at one section thereof which, at a certain angular position of the magnet wheel, is located opposite a U-shaped armature with coil. Due to the magnetic flux changes caused by the closing and opening of the magnetic circuit between permanent magnet and armature, a voltage is induced in the coil which is used to load a capacitor. At a defined ignition point, which may be derived from the induced voltage, the capacitor is discharged via the ignition coil that generates an ignition spark at a spark plug arranged within the combustion chamber.

The permanent magnet arranged on the magnet wheel is displaced by a small amount radially inwardly relative to the periphery of the magnet wheel and is provided with two pole shoes. The pole shoes are comprised of a magnetically conducting material and extend to the periphery of the magnet wheel so that the formation of a magnetic circuit between the permanent magnet and the armature is possible. In order to support the centrifugal forces generated upon rotation of the magnet wheel, the pole shoes and the permanent magnet must be secured in a suitable manner.

The magnet wheel, for a secure receiving and supporting of the pole shoes and of the permanent magnet, must be provided in a correspondingly stiff and heavy embodiment. This is disadvantageous with respect to the total weight of the combustion engine, especially for hand-held working tools such as, for example, motor chainsaws.

It is therefore an object of the present invention to improve a magnetic ignition system of the aforementioned kind such that for a lightweight construction of the magnet wheel and for a high magnetic flux the acting centrifugal forces can be securely supported.

SUMMARY OF THE INVENTION

The magnetic ignition system for an internal combustion engine according to the present invention is primarily characterized by:

A magnet wheel revolving with the crankshaft of the engine;

At least one permanent magnet rotating with the magnet wheel;

A stationary armature with a coil;

The permanent magnet inducing a voltage in the coil, the voltage being supplied to an energy storage; and The magnet wheel having a magnet support comprised of a magnetically conducting material, wherein a section of the magnet support that is in magnetic shunt is magnetically saturated.

Preferably, the magnetic wheel and the magnet support form a unitary part.

Expediently, the magnet wheel is comprised of magnetically non-conducting material. The magnetically non-conducting material is preferably plastic.

Advantageously, the magnet support has a pocket for receiving the permanent magnet.

Advantageously, the pocket in the circumferential direction of the magnet support has a greater length than the permanent magnet so as to allow for an alteration of the course of amplitude of the magnetic field along the circumference of the magnet support.

Preferably, at least two of the permanent magnets are sequentially arranged in the circumferential direction of the magnetic support. In a preferred embodiment, two of the permanent magnets are provided.

Expediently, the permanent magnet projects radially past a periphery of the magnet support.

In a preferred embodiment of the present invention, the permanent magnet, when viewing the magnet support from the side, has the shape of a trapezoid and is positioned on the magnet support such that the shorter side of the trapezoid is located radially outwardly relative to the longer side of the trapezoid.

Preferably, the permanent magnet in the axial direction of the crankshaft has a greater width than the magnetic support.

Preferably, the permanent magnet is arranged asymmetrically to a central plane of the magnet support.

The permanent magnet in the circumferential direction of the magnet support has a width that changes, i.e., becomes narrower, wider, or narrows and then widens or widens and then narrows. Preferably, the permanent magnet, is shaped as a trapezoid. Advantageously, at least one side of the permanent magnet is convex.

Preferably, a longitudinal axis of the permanent magnet intercepts an imaginary circle concentric to a center of the crank shaft.

Preferably, the gap between the magnet support and the armature has a width that changes in a circumferential direction of the magnet support, i.e., narrows or widens.

Due to the magnet support arranged at the magnet wheel and made of magnetically conducting material, the pole shoes are no longer needed. This results in a reduced weight and also in a constructive simplification. The task of the pole shoes, i.e., focusing the magnetic field, is taken over by the parts of the magnet support which are positioned within the area of the magnetic circuit. Since the magnet support is made from a magnetically conductive material, magnetic shunt is produced which, however, flows through narrowly constructed wall sections of the magnet support which are thus magnetically saturated so that the magnetic shunt is small and can thus be tolerated.

In a simple embodiment of the present invention the magnet wheel together with the magnet support can be provided as a unitary part so that additional fastening means for the magnet support are obsolete.

For some applications if may also be advantageous to provide magnet wheel and magnet support as separate parts whereby the magnet wheel should be comprised of magnetically non-conducting material of low density, preferably plastic, so that the arrangement is lightweight.

The magnet support may be provided with receiving pockets which secure the permanent magnets radially against centrifugal forces. The receiving pockets may have a greater length in the circumferential direction than the inserted permanent magnets so that in the circumferential direction at least one area of lower magnetic conductivity may be defined in the end section of one of the receiving pockets. With this measure the timely course of the induced voltage can be influenced. A further possibility of influencing the timely course of the induced voltage is provided by varying the gap between the armature and the magnet support.

In another embodiment a plurality of permanent magnets are arranged sequentially in the circumferential directions on the magnet support in order to provide for the desired magnetic field. Preferably, two individual magnets are positioned sequentially at a certain distance in the rotational direction of the magnet wheel which distance is selected as a function of the position of the armature and as a function of the desired course of the induced voltage.

BRIEF DESCRIPTION OF THE DRAWINGS

The object and advantages of the present invention will appear more clearly from the following specification in conjunction with the accompanying drawings, in which.

DESCRIPTION OF PREFERRED EMBODIMENTS

The present invention will now be described in detail with the aid of several specific embodiments utilizing FIGS. 1 through 13.

Figure 1:
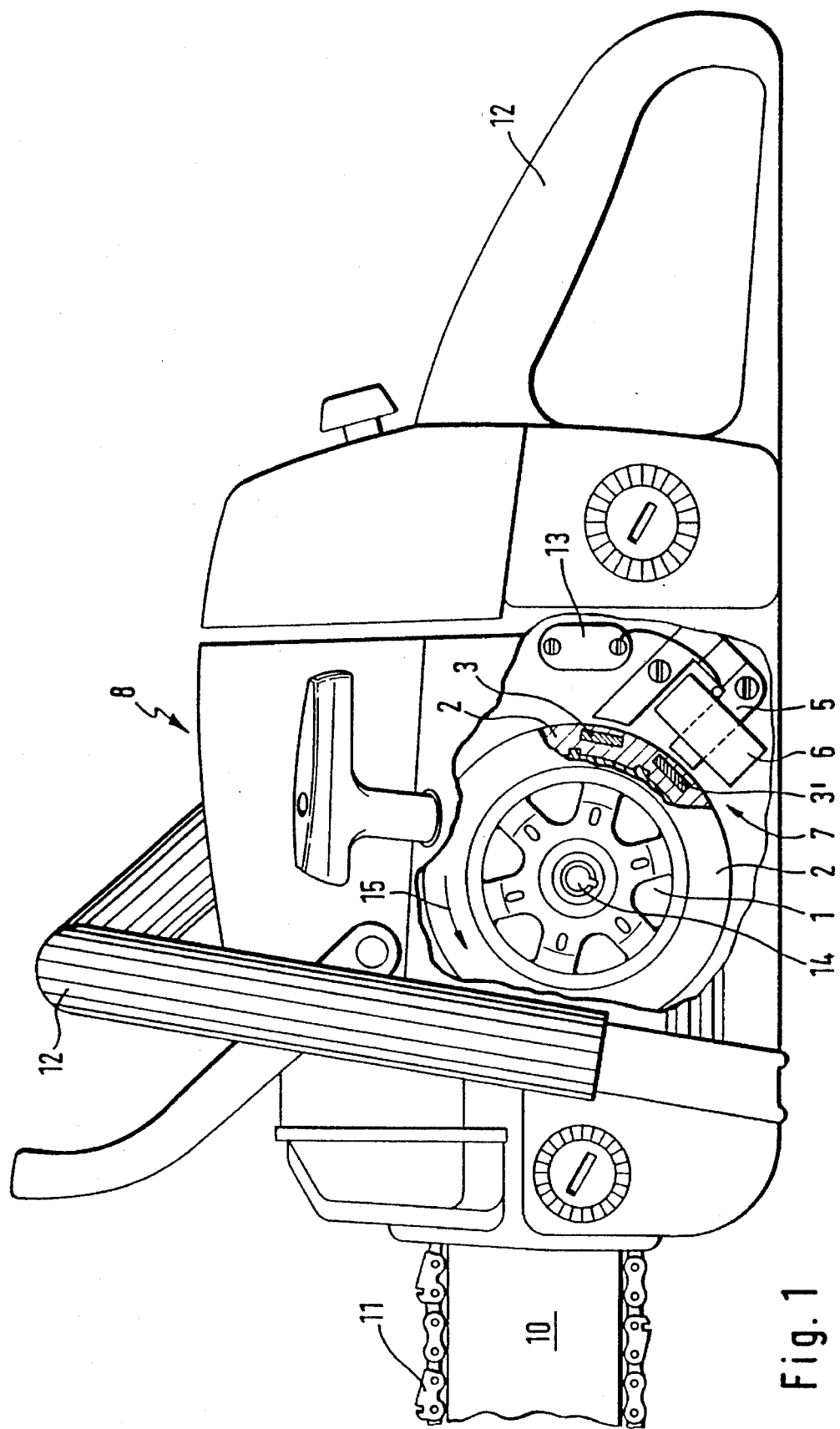
FIG. 1 shows a schematic side view of a motor chainsaw with the magnetic ignition system shown in section.
Figure 2:
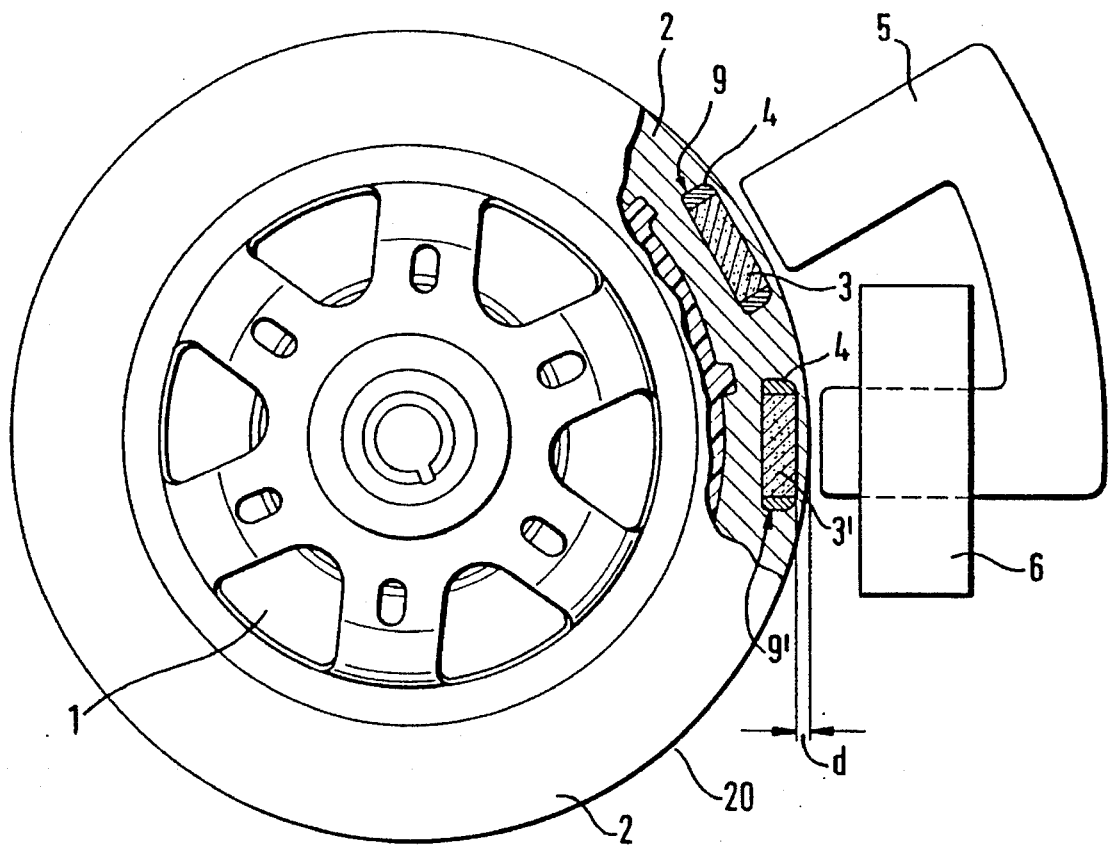
FIG. 2 shows in an enlarged representation the magnetic ignition system of FIG. 1.
Figure 3:
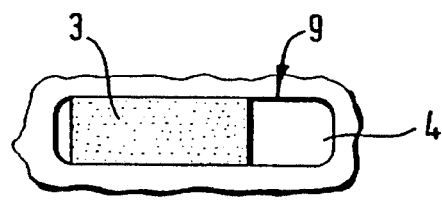
FIG. 3 shows a side view of a receiving pocket with permanent magnet inserted.
Figure 4:
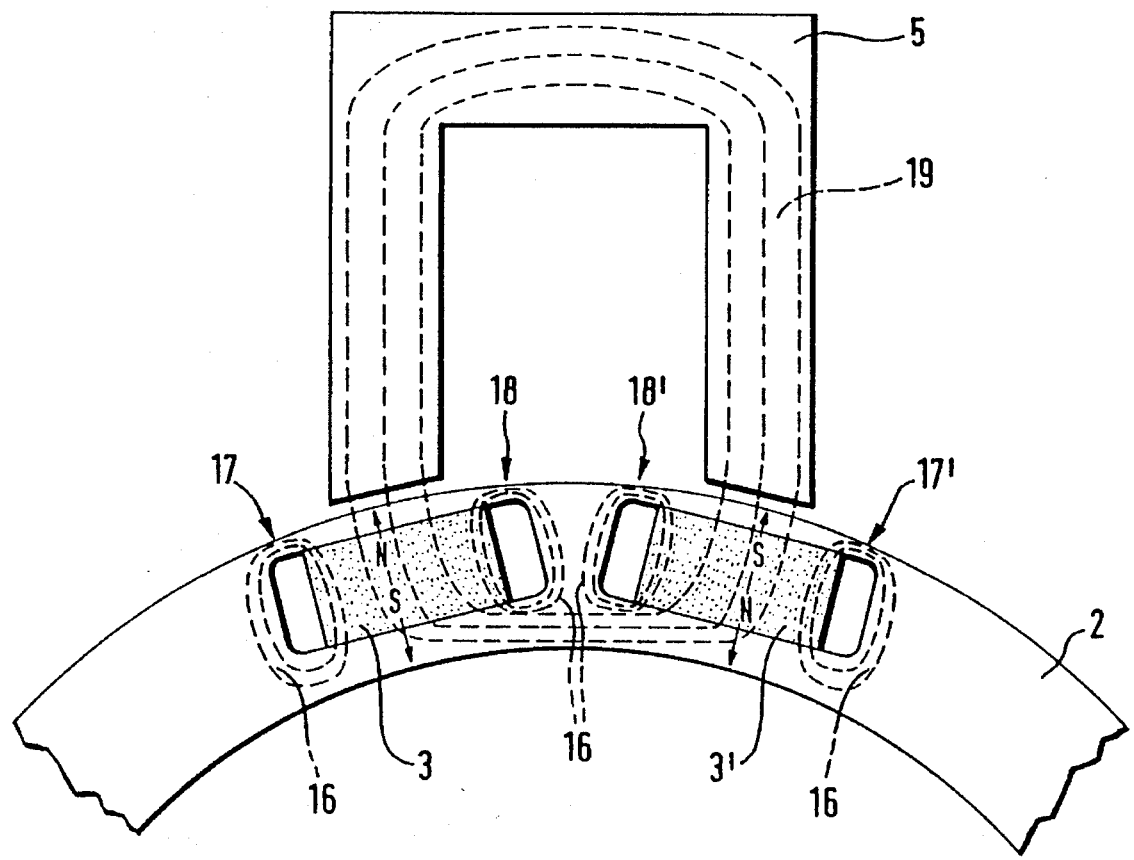
FIG. 4 shows a schematic representation of the magnetic flux lines of a permanent magnet pair.

The inventive magnetic ignition system can be mounted especially advantageously in motor chainsaws with remote fired combustion engines. FIG. 1 shows such a motor chainsaw 8 in a schematic representation. The chainsaw 8 comprises a saw blade 10 with circulating saw chain 11 and is guided by an operator with two grips 12. The saw chain 11 is connected via a non-represented coupling with the driven crankshaft 14 on which are situated a fan or magnet wheel 1. A magnet support 2 is connected to the magnet wheel 1 and serves to receive two permanent magnets 3, 3' arranged sequentially in the circumferential direction. Magnet wheel 1 and magnet support 2 rotate in the direction of arrow 15 and convey the permanent magnet pair 3, respectively, 3' past the armature 5 whereby in the coil 6 of the armature 5 a voltage is induced corresponding to the changes of the magnetic flux.

The induced voltage is supplied to a control and storage unit 13 which with non-represented elements, for example, capacitors, provides for energy storage and which via an ignition coil provides for ignition at a defined point in time. The control and storage unit 13 may form a constructive unit together with the coil 6.

According to the invention the magnet support 2 is comprised of magnetically conducting material, for example, ferromagnetic soft iron, which allows for the formation of a magnetic closed circuit between one or more permanent magnets and the armature 5. In order to keep losses due to magnetic conductivity of the magnet support 2 as low as possible, the wall section of the magnet support 2 within the area of magnetic shunt must be magnetically saturated. In the shown embodiment the areas 17 and 18, 17' and 18' correspond to this wall section. The magnetic lines of flux extending in the north-south direction from the permanent magnets 3, 3' form together with the armature 5 a magnetic main flux 19 while in the axial edge portions of the permanent magnets a magnetic shunt flux 16 results which is low due to the narrow, stay-like wall sections 17, 18 and 17', 18' positioned within the saturation area.

The magnet wheel 1 and the magnet support 2 can be produced either as a unitary part of a magnetically conducting material or, according to another embodiment, may be produced as two separate components. In the latter case the magnet wheel 1 advantageously is comprised of magnetically non-conducting material, for example, plastic (see FIG. 2). Instead of plastic material it is, of course, also possible to use any other suitable material for the magnet wheel 1 as long as the requirements for a low total weight can be fulfilled. Especially with working tools with small engines as shown in this invention it is important with respect to the available power output, that the moved masses are as low as possible.

For the one-part as well as for the two-part embodiment of magnet wheel and magnet support, it is expedient to provide the magnet support with spokes and hollow spaces between the spokes for the purpose of a further weight reduction. For a secure positioning of the permanent magnets 3 and 3' within the magnet support 2, receiving pockets 9, 9' are provided within the magnet support 2 into which the permanent magnets 3, 3' are inserted, for example, in the axial direction so that they are securely held especially with respect to centrifugal forces. However, it is also possible to provide receiving pockets or openings 9 and 9' in the form of undercuts. In the circumferential direction the receiving pockets may have a greater length than the permanent magnets so that a gap 4 is defined with which the amplitude course of the magnetic field can be changed in the circumferential direction of the magnet support 2.

The number of permanent magnets 3, 3' arranged in sequence in the circumferential direction of the magnet support 2 can vary greatly and depends on various factors such as, for example, the strength of the electric voltage to be induced. In the shown embodiment two permanent magnets 3 and 3' are arranged one after the other. In order to prevent imbalance due to the asymmetric arrangement of the permanent magnets when rotating magnet wheel 1 and magnet support 2 it may be expedient to provide a counterweight at the magnet wheel 1 or at the magnet support 2 in the radially opposite area for compensating the imbalance. In contrast, with a symmetric arrangement of the permanent magnets no imbalance problems will occur.

Figure 5:
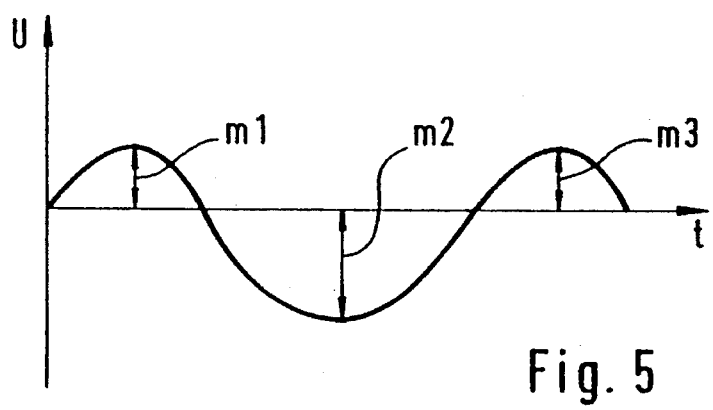
FIG. 5 shows schematically the course of the voltage of an induced voltage for a rotating magnet wheel.
Figure 12:
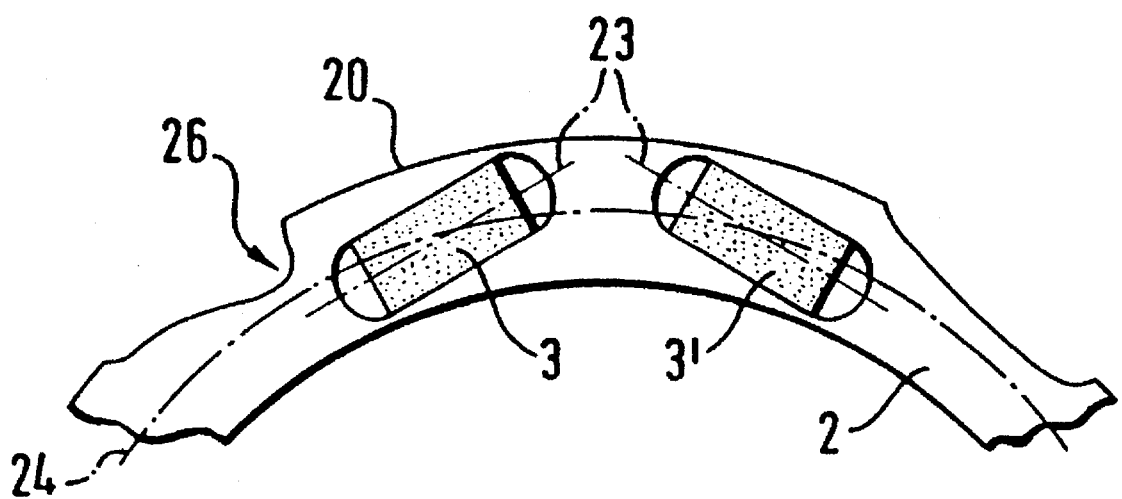
FIG. 12 shows a side view of a magnet support with two slantedly arranged permanent magnets.
Figure 13:
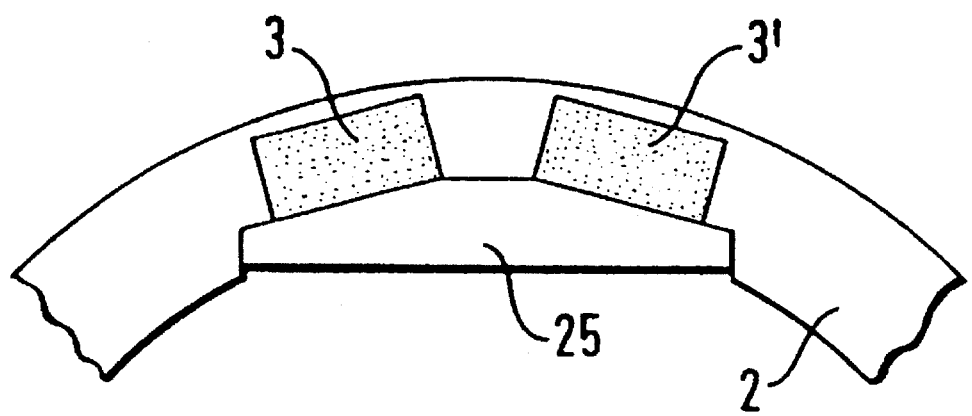
FIG. 13 shows a side view of a magnet support with a permanent magnet pair and a pole shoe connecting the permanent magnets.

For a targeted effect on the course of the induced voltage, the magnetic field generated by the permanent magnets is preferably influenced by simple constructive measures. For example, such a measure is provided by positioning an air gap within the magnetic circuit. The permeability of the air gap in comparison to the magnetically conductive material is smaller by a substantial amount. This air gap can be provided in a simple manner when, for example, as shown in FIG. 12, the peripheral outline of the magnet support 2 is not a coaxial circle. When the course of the magnetic field at the periphery of the magnet support 2 is desired to be comprised of half waves that are wider than the width of the permanent magnets, it is possible to generate these half waves by providing receiving pockets for the permanent magnets that are wider than the width of the permanent magnets. The course of the induced voltage as shown in FIG. 5 has per revolution of the magnet wheel 1 three half waves of different amplitudes $m_1$, $m_2$, $m_3$ and width. The central half wave with amplitude $m_2$ is generated when the permanent magnets engage both arms of the armature 5.

The course of the induced voltage over time can be influenced advantageously by other constructive measures. In addition to the use of different numbers of sequentially arranged permanent magnets of different magnetization strength, the magnetic field can also be influenced by different geometric forms of the permanent magnets as well as different positions on the magnet support.

Figure 6:
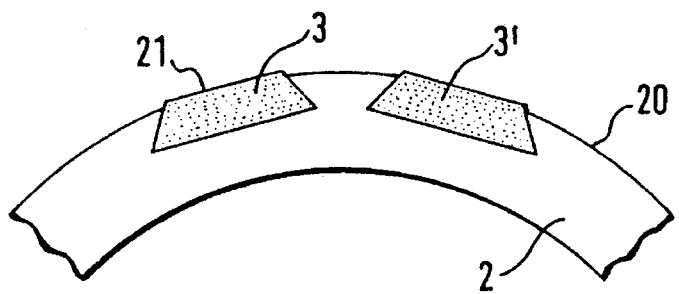
FIG. 6 shows a side view of a magnet support with a permanent magnet pair of a trapezoidal shape.

The permanent magnets 3 and 3' in an advantageous embodiment can project past the peripheral outline 20 of the magnet supports 2 (see FIG. 6). In this Figure the permanent magnets, in a side view of the magnet support 2, have a trapezoidal shape whereby the side 21 with the shorter length is positioned radially farther outwardly within the magnet support 2 so that a radial escape due to the resulting centrifugal forces upon rotation can be prevented.

Figure 7:
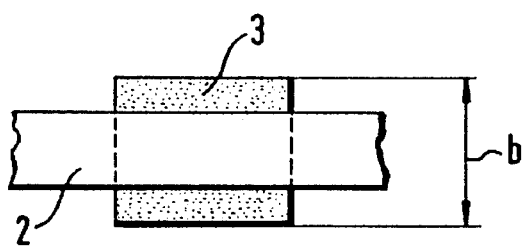
FIG. 7 shows an end view of a magnet support with a permanent magnet having a greater width than the magnet support.
Figure 8:
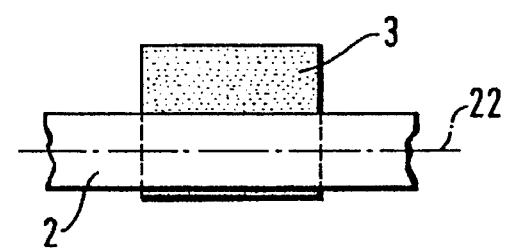
FIG. 8 shows an end view of a magnet support with axially displaced permanent magnets.

In another embodiment the permanent magnet can have a greater width b in the axial direction of the crankshaft than the magnet support 2 (see FIGS. 7 and 8). In addition to the effect on the magnetic field this arrangement also has the advantage of further weight reduction. The permanent magnet can also be arranged asymmetrically to the center plane 22 of the magnet support 2 (FIG. 8).

Figure 9:
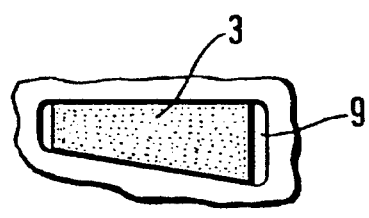
FIG. 9 shows a plan view of a receiving pocket with trapezoidal permanent magnet.
Figure 10:
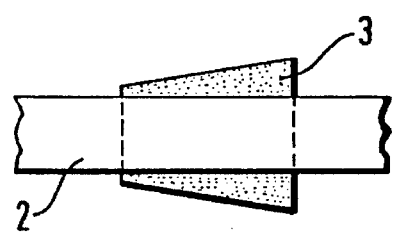
FIG. 10 shows an end view of a magnet support with trapezoidal permanent magnets.
Figure 11:
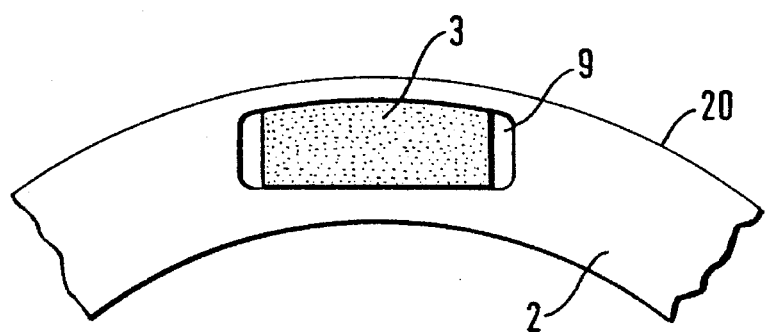
FIG. 11 shows a side view of a magnet support with convexly shaped permanent magnet.

In a further embodiment the permanent magnet 3 in the circumferential direction of the magnet support 2 has a changing width. For example, the permanent magnet in a plan view can be in the shape of a trapezoid whereby asymmetric as well as symmetric shapes are possible (FIG. 9 shows a change in width in the plane of the magnet support 2). FIG. 10 shows an end view of the magnet support 2 with a trapezoidal magnet 3, whereby the width of the magnet is changed perpendicular to the plane of the magnet support 2. The permanent magnet according to FIG. 11 also does not have a constant width over its length whereby the outer side of the permanent magnet facing the periphery line 20 of the magnet support 2 is convexly shaped. This convex side of the permanent magnet can advantageously be positioned in a concentric distance to the peripheral line 20.

In yet another embodiment according to FIG. 12 the permanent magnets can be arranged such that their longitudinal axes 23 do not extend tangentially to an imaginary circle 24 concentric to the center of the crankshaft, but relative to this tangential position are slanted at a certain angle and intercept the circle 24. The same Figure also shows that between magnet support 2 and armature 5 an air gap is provided that over the circumference of the magnet support has a changing width. The peripheral outline 20 can have a shape that deviates from a circle, for example, in order to influence the magnetic field with an air gap in the form of recess 26.

Another possibility for influencing the magnetic field lies in the use of pole shoes which advantageously are made of a material that is more magnetically conductive than the material of which the magnet support 2 is manufactured. Since the pole shoes do not necessarily provide a securing function for the permanent magnets, they can be connected to the magnet support with simple securing measures similar to the one used for the permanent magnets. According to FIG. 13 a pole shoe 25 connects the radially inwardly facing sides of the permanent magnets 3 and 3'.

In the shown embodiments two permanent magnets are advantageously arranged in the circumferential direction of the magnet support. It may also be sufficient to arrange only one (preferably stronger) permanent magnet and to provide a second pole opposite the armature with a corresponding constructive embodiment of the magnet support. If required for the desired shape of the induced voltage signals, it is also possible to provide a plurality of permanent magnets that in the circumferential direction of the magnet support are sequentially arranged, especially as neighboring permanent magnets.

The present invention is, of course, in no way restricted to the specific disclosure of the specification and drawings, but also encompasses any modifications within the scope of the appended claims.

What we claim is:

1. A magnetic ignition system for an internal combustion engine, said system comprising:

a magnet wheel revolving with a crankshaft of the engine;

at least one permanent magnet rotating with said magnet wheel;

a stationary armature with a coil;

said permanent magnet inducing a voltage in said coil, said voltage being supplied to an energy storage; and said magnet wheel having a magnet support comprised of a magnetically conducting material, wherein a wall section of said magnet support being in magnetic shunt is magnetically saturated.

2. A magnetic ignition system according to claim 1, wherein said magnet wheel and said magnet support form a unitary part.

3. A magnetic ignition system according to claim 1, wherein said magnet wheel is comprised of magnetically non-conducting material.

4. A magnetic ignition system according to claim 3, wherein said magnetically non-conducting material is plastic.

5. A magnetic ignition system according to claim 1, wherein said magnet support has a pocket for receiving said permanent magnet.

6. A magnetic ignition system according to claim 5, wherein said pocket in a circumferential direction of said magnet support has a greater length than said permanent magnet so as to allow for an alteration of the course of amplitude of the magnetic field along the circumference of said magnetic support.

7. A magnetic ignition system according to claim 1, wherein at least two of said permanent magnets are sequentially arranged in a circumferential direction of said magnetic support.

8. A magnetic ignition system according to claim 6, wherein two of said permanent magnets are provided.

9. A magnetic ignition system according to claim 1, wherein said permanent magnet projects radially past a periphery of said magnet support.

10. A magnetic ignition system according to claim 1, wherein said permanent magnet, when viewing said magnet support from the side, has the shape of a trapezoid and is positioned on said magnet support such that the shorter side of the trapezoid is located radially outwardly relative to the longer side of the trapezoid.

11. A magnetic ignition system according to claim 1, wherein said permanent magnet in the axial direction of the crank shaft has a greater width than said magnetic support.

12. A magnetic ignition system according to claim 1, wherein said permanent magnet is arranged asymmetrically to a central plane of said magnet support.

13. A magnetic ignition system according to claim 1, wherein said permanent magnet in the circumferential direction of said magnet support has a width that changes.

14. A magnetic ignition system according to claim 13, wherein said permanent magnet is shaped as a trapezoid.

15. A magnetic ignition system according to claim 13, wherein at least one side of said permanent magnet is convex.

16. A magnetic ignition system according to claim 1, wherein a longitudinal axis of said permanent magnet intercepts an imaginary circle concentric to a center of the crank shaft.

17. A magnetic ignition system according to claim 1, wherein a gap between said magnet support and said armature has a width that changes in a circumferential direction of said magnet support.

* * * * *